US008558710B1

(12) United States Patent
Nitz

(10) Patent No.: US 8,558,710 B1
(45) Date of Patent: Oct. 15, 2013

(54) DUPLEX OUTLET WITH CURRENT INDICATOR

(76) Inventor: Steven M. Nitz, Billings, MT (US)

( * ) Notice: Subject to any disclaimer, the term of this patent is extended or adjusted under 35 U.S.C. 154(b) by 370 days.

(21) Appl. No.: 12/954,170

(22) Filed: Nov. 24, 2010

Related U.S. Application Data

(60) Provisional application No. 61/264,372, filed on Nov. 25, 2009.

(51) Int. Cl.
*G08B 21/00* (2006.01)

(52) U.S. Cl.
USPC ........... 340/657; 340/654; 340/656; 340/664; 340/691.7; 439/488; 439/646; 439/650; 439/490

(58) Field of Classification Search
USPC ......... 340/657, 664, 691.1, 654, 656; 307/98, 307/125, 126; 439/488, 490, 646, 650
See application file for complete search history.

(56) References Cited

U.S. PATENT DOCUMENTS

| | | | |
|---|---|---|---|
| 4,395,640 A | 7/1983 | Bone | |
| 4,522,455 A * | 6/1985 | Johnson | 439/92 |
| 4,755,913 A | 7/1988 | Sleveland | |
| 4,774,641 A | 9/1988 | Rice | |
| 4,875,152 A * | 10/1989 | Foster | 363/146 |
| 5,413,501 A | 5/1995 | Munn | |
| 5,485,356 A | 1/1996 | Nguyen | |
| 5,638,243 A * | 6/1997 | Torezan et al. | 361/42 |
| 5,650,771 A * | 7/1997 | Lee | 340/656 |
| 5,781,015 A * | 7/1998 | Duffin et al. | 324/508 |
| 5,844,326 A * | 12/1998 | Proctor et al. | 307/34 |
| 5,923,517 A * | 7/1999 | Murphy | 361/111 |
| 5,962,932 A * | 10/1999 | Matlo | 307/126 |
| 6,036,536 A | 3/2000 | Chiu | |
| 6,087,588 A | 7/2000 | Soules | |
| 6,095,850 A * | 8/2000 | Liu | 439/488 |
| 6,379,164 B1 * | 4/2002 | Cash, Jr. | 439/106 |
| 6,423,900 B1 * | 7/2002 | Soules | 174/66 |
| 6,552,888 B2 * | 4/2003 | Weinberger | 361/57 |
| 6,710,553 B2 * | 3/2004 | Logan | 315/291 |
| 7,497,740 B2 * | 3/2009 | Mei et al. | 439/652 |
| 7,635,273 B2 * | 12/2009 | Buzil et al. | 439/214 |
| 7,930,118 B2 * | 4/2011 | Vinden et al. | 702/64 |
| 8,175,533 B2 * | 5/2012 | Schubert | 455/66.1 |
| 8,221,166 B2 * | 7/2012 | Heffernan | 439/651 |
| 8,471,718 B1 * | 6/2013 | Miller et al. | 340/654 |
| 2002/0149502 A1 * | 10/2002 | Goss | 340/870.07 |

* cited by examiner

*Primary Examiner* — Daniel Wu
*Assistant Examiner* — Son M Tang
(74) *Attorney, Agent, or Firm* — Montgomery Patent & Design; Robert C. Montgomery

(57) ABSTRACT

An apparatus that enables indication of power utilization from an electrical outlet to be visually provided to a user, comprising receptacles, an illumination means, and a toggle switch. When an electrical power cord is plugged into the apparatus and is drawing any amount of current above zero (0) amps, the illumination means will activate, thereby alerting the user that the device is drawing power, even if the device is turned off, and allowing the user to take corrective action if necessary. The integral toggle switch deactivates the power to the device while leaving it plugged in.

18 Claims, 4 Drawing Sheets

DUPLEX OUTLET WITH CURRENT INDICATOR

RELATED APPLICATIONS

The present invention was first described in and claims the benefit of U.S. Provisional Application No. 61/264,372 filed Nov. 25, 2009, the entire disclosures of which are incorporated herein by reference.

FIELD OF THE INVENTION

The present invention relates generally to electrical power outlets, and in particular, to a load sensor and indicator circuit for electrical power outlets.

BACKGROUND OF THE INVENTION

Electricity consumption continues to grow in our country. Not only are our homes becoming bigger which places larger demands on lighting and HVAC loads, but also the information and entertainment devices we put in them are becoming larger and more plentiful.

Since electricity is invisible, many people have no idea how much power is being consumed by an individual load. As such, it is very difficult to determine what devices to turn off or not use in an effort to conserve electricity. Even if one can read the power consumption label on the device, it is very difficult for the average consumer to determine what it costs per minute or per hour to run such equipment due to relatively complicated formulas, and the variable power rates in effect in various communities.

Specifically, electrical loads commonly known as "parasitic loads" or "phantom electricity" consume power or draw current even when in an off or a de-energized state. Specific examples of such "parasitic loads" include electronic loads such as televisions, stereos, or the like in which remote control circuitry is always active to "look" for activation or "power on" signals. Other examples include wall mounted power supplies such as charges, computer power supplies, low voltage transformers, or the like, in which transformer losses are always present even if the transformer secondary is open circuited. In fact, such "parasitic loads" are common in both home and work environments and contribute to an overall staggering amount of power consumed around the world today.

Various attempts have been made to provide electrical outlets with integral status indicators. Examples of these attempts can be seen by reference to several U.S. patents. U.S. Pat. No. 4,755,913, issued in the name of Sleveland, describes a light-emitting diode assembly for an electrical switch wall plate indicating both the location of the switch in the dark as well as the functional status of the circuit.

U.S. Pat. No. 5,485,356, issued in the name of Nguyen, describes a receptacle power indicator including indicator light which is activated by contact arms of the device to indicate whether the receptacle is energized.

U.S. Pat. No. 5,962,932, issued in the name of Matlo, describes a power supply apparatus with a circuit load sensor including a power consumption indicator circuit.

While these devices fulfill their respective, particular objectives, each of these references suffer from one (1) or more of the aforementioned disadvantages. Many such devices indicate whether a receptacle is energized but not whether it is drawing load. Furthermore, many such devices only include one indicator light for a plurality of connectors. Also, many such devices do not provide a means to mitigate extraneous power consumption. Accordingly, there exists a need for an electrical outlet without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for an electrical outlet which allows a user to determine whether the outlet is drawing power at any given point in time and to mitigate power consumption should such a draw be deemed extraneous. Thus, the object of the present invention is to solve the aforementioned disadvantages and provide for this need.

To achieve the above objectives, it is an object of the present invention to provide measurement and indication of electrical consumption from an electrical load connected to a duplex outlet, particularly "parasitic loads" or "phantom electricity". The apparatus comprises a pair of current sensors and a pair of indicating means integral to a duplex outlet configuration.

Another object of the present invention is to comprise the duplex outlet configuration of a similar construction to a conventional NEMA 5-15R receptacle. The duplex outlet configuration further comprises a pair of mounting ears which facilitate mounting to an existing electrical box.

Yet still another object of the present invention is to illuminate the indicating means when an active electrical load is connected to a corresponding connection. In this manner a user can determine whether a device is drawing electrical power even when the device is an "OFF" state.

Yet still another object of the present invention is to allow a user to electrically disconnect a load from the power supply without physical removing the electrical plug in order to remove a "parasitic load" and conserve energy. A front surface of the receptacle enclosure includes a disconnecting switch of a double-pole double-throw variety to allow for the removal of both loads presented by each receptacle.

Yet still another object of the present invention is to provide a method of utilizing the device that provides a unique means of obtaining an instance of the apparatus, connecting the existing electrical wire to a corresponding conductor, fastening the receptacle enclosure to the electrical box utilizing a plurality of fasteners in conjunction with the mounting ears, fastening the faceplate to the receptacle enclosure, plugging in various electrical loads, closing the disconnecting switch to enable the electrical load to function in a normal manner, viewing the indicating means to determine the status of the load on a corresponding receptacle, removing the electrical load by opening the disconnecting switch, and providing simple visualization of electric power consumption.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
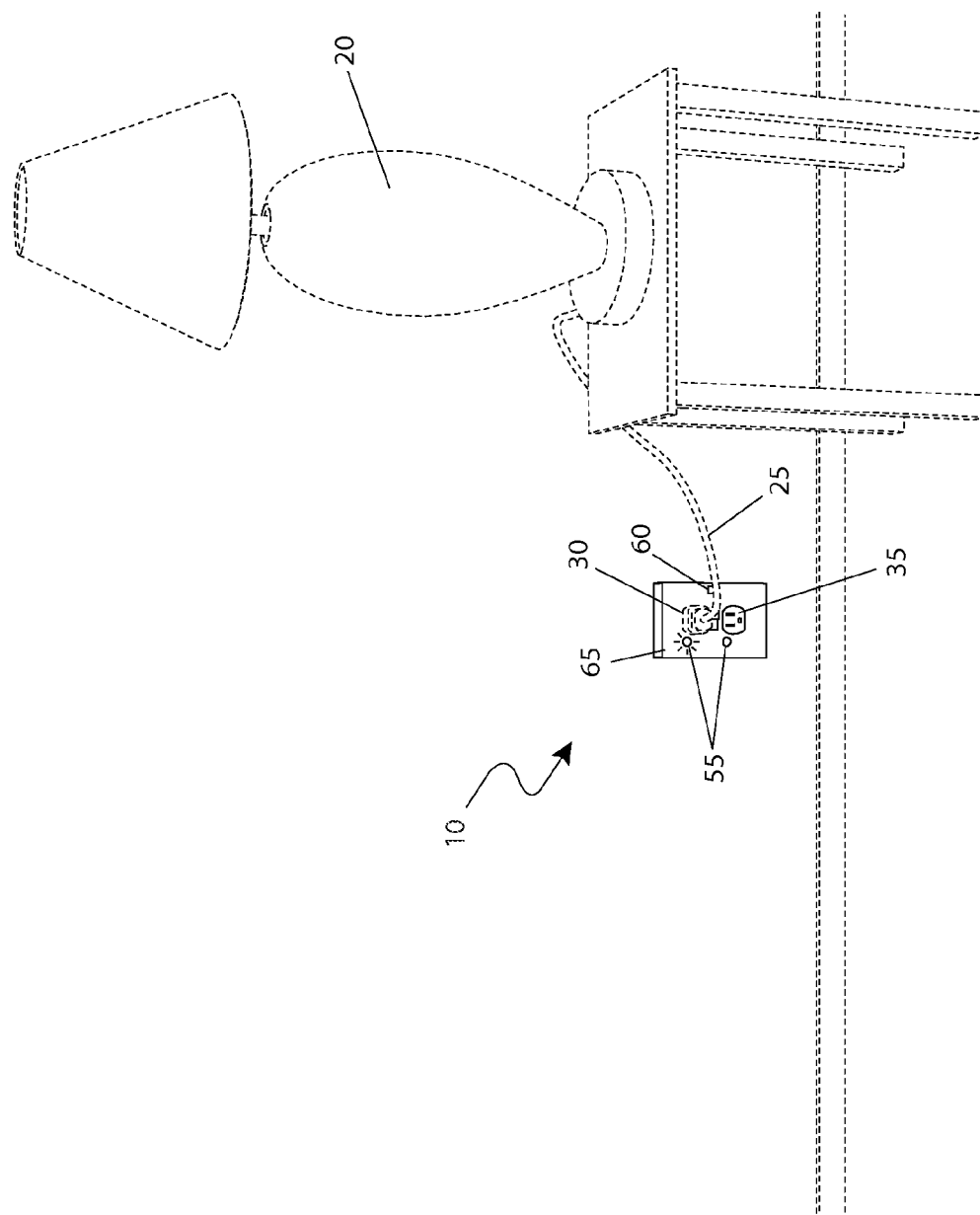
FIG. 1 is an environmental view of a duplex outlet with current indicator 10, according to the preferred embodiment of the present invention.

DESCRIPTIVE KEY 10 duplex outlet with current indicator
12 electrical box
15 duplex outlet configuration
16 receptacle enclosure
17 mounting ear
18 mounting aperture
19 faceplate aperture
20 electrical load
25 power cable
30 electrical plug contact
35 receptacle
40 ungrounded or "hot" connection
45 grounded or neutral connection
50 safety/equipment ground connection
55 indicating means
60 disconnecting switch
65 faceplate
66 receptacle opening
67 indicating means opening
68 switch opening
69 mounting opening
70 fastener
90 ungrounded or "hot" conductor
95 grounded or neutral conductor
100 safety/equipment ground conductor
105 current sensor
110 analog input converting module

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a duplex outlet with current indicator (herein described as the "apparatus") 10, which provide a means to measure and indicate electrical consumption from an electrical load 20 via a pair of indicating means 55 and a pair of current sensor 105, respectively. Specifically, electrical loads 20 commonly known as "parasitic loads" or "phantom electricity" would be those targeted for use with the apparatus 10. The common characteristic of such loads 20 is that they consume power or draw current even when in an off or a de-energized state. Specific examples of such "parasitic loads" include electronic loads such as televisions, stereos, or the like in which remote control circuitry is always active to "look" for activation or "power on" signals. Other examples include wall mounted power supplies such as charges, computer power supplies, low voltage transformers, or the like, in which transformer losses are always present even if the transformer secondary is open circuited. In fact, such "parasitic loads" are common in both home and work environments and contribute to an overall staggering amount of power consumed around the world today. Such power is indicated by the apparatus 10 in an effort to make intelligent decisions about connected electrical loads as will be described below.

Referring now to FIG. 1, a perspective view of the apparatus 10, according to the preferred embodiment of the present invention, is disclosed. In its preferred embodiment, the apparatus 10 comprises a duplex outlet configuration 15 as would normally be expected in a typical residential, commercial, institutional, or industrial establishment. The duplex outlet configuration 15 would be of a conventional NEMA 5-15R receptacle, in a duplex configuration or a LUTRON® configuration. However, other configurations including receptacle arrangements, voltage levels, current capacity, or the like are also possible, and as such, should not be interpreted as a limiting factor of the present invention. The duplex outlet configuration 15 is depicted with the electrical load 20 in an electrically connected state via a power cable 25 and an electrical plug 30 as would be typically expected. For purposes of illustration, the electrical load 20 is depicted as a common table lamp, although any type of electrical load 20 would suffice for illustrating the purposes of the present invention. Additionally, any load 20 that would be acceptable for plugging into a conventional electrical outlet of similar type, voltage and ampacity, would work with the apparatus 10 as well.

Figure 2:
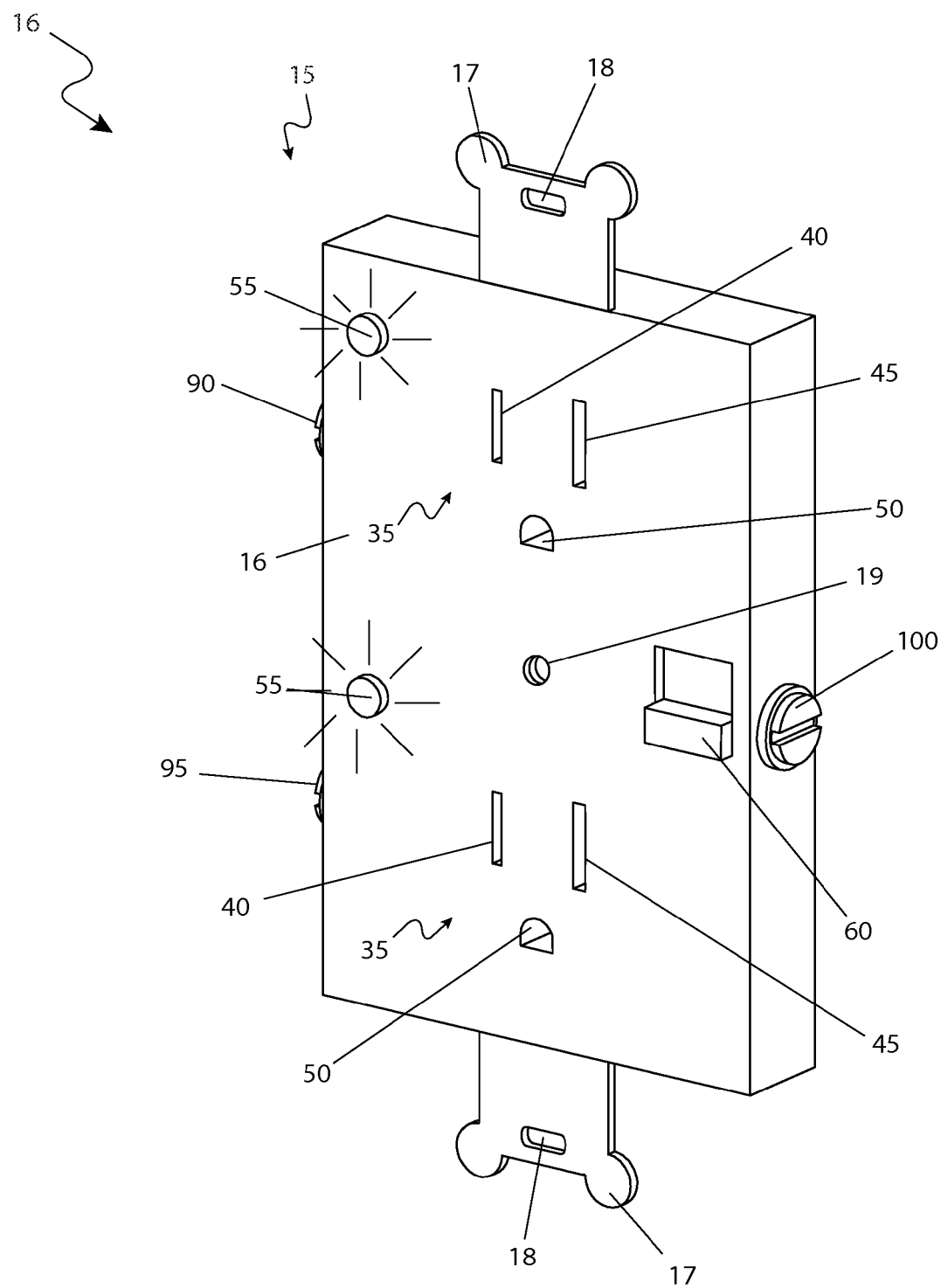
FIG. 2 is a front perspective view of a receptacle enclosure 16, according to the preferred embodiment of the present invention.

Referring now to FIG. 2, a front perspective view of the receptacle enclosure 16, according to the preferred embodiment of the present invention, is disclosed. This figure depicts the receptacle enclosure 16 which more clearly depicts the front of the duplex outlet configuration 15. The receptacle enclosure 16 comprises a generally rectangular shape further comprising a pair of mounting ears 17, a pair of stacked receptacles 35, a pair of indicating means 55, and a disconnecting switch 60. The receptacle enclosure 16 is preferably fabricated from a durable non-conductive material such as plastic, yet other materials may be utilized without limiting the scope of the apparatus 10. Integrally molded to an upper and a lower front surface of the receptacle enclosure 16 are the mounting ears 17 which provides a means to attach the apparatus 10 to a common electrical box 12 (see FIG. 3) via inserting a mechanical fastener 70 through a mounting aperture 18. The mounting ears 17 also act as spacers to provide room for electrical wiring to be routed from an electrical box 12 to the receptacle configuration 16.

Each receptacle 35 provides three (3) connections that provide an ungrounded or "hot" connection 40, a grounded or neutral connection 45 and a safety/equipment ground connection 50 as shown, as would typically and conventionally be expected. Each receptacle 35 would be provided with an indicating means 55 such as a light-emitting diode (LED lamp) or similar illuminating device. The indicating means 55 would illuminate when an electrical load 20 (as shown in FIG. 1) is connected to the respective receptacle 35 and is drawing current. In the case of the conventional table lamp (as shown in FIG. 1), with an incandescent bulb in the OFF position, no current would be drawn, and thus the indicating means 55 would be off. However, in the case of a "parasitic load" as abovementioned, even if the electrical load 20 is in an OFF position, a relatively small amount of power would be drawn, and thus the indicating means 55 would illuminate for the respective load.

A disconnecting switch 60 is also provided on the face of the receptacle enclosure 16 to allow for the electrical disconnection of any electrical plug 30 (as shown in FIG. 1) that may be plugged into either receptacle 35, without the actual physical disconnection of the electrical plug 30 (as shown in FIG. 1). Said features of the disconnecting switch 60 allow for the removal of any "parasitic load" without the necessity, additional physical work, or safety risks associated with removing and inserting an electrical plug 30 into the receptacles 35. The disconnecting switch 60 would be of a double-pole, double-throw variety to allow for removal of both loads presented by each receptacle 35.

An intermediate surface of the receptacle enclosure 16 further comprises a faceplate aperture 19 which provides a means for a faceplate 65 (see FIG. 3) to attach. The faceplate aperture 19 is preferably threaded to accept a corresponding fastener 70.

Figure 4:
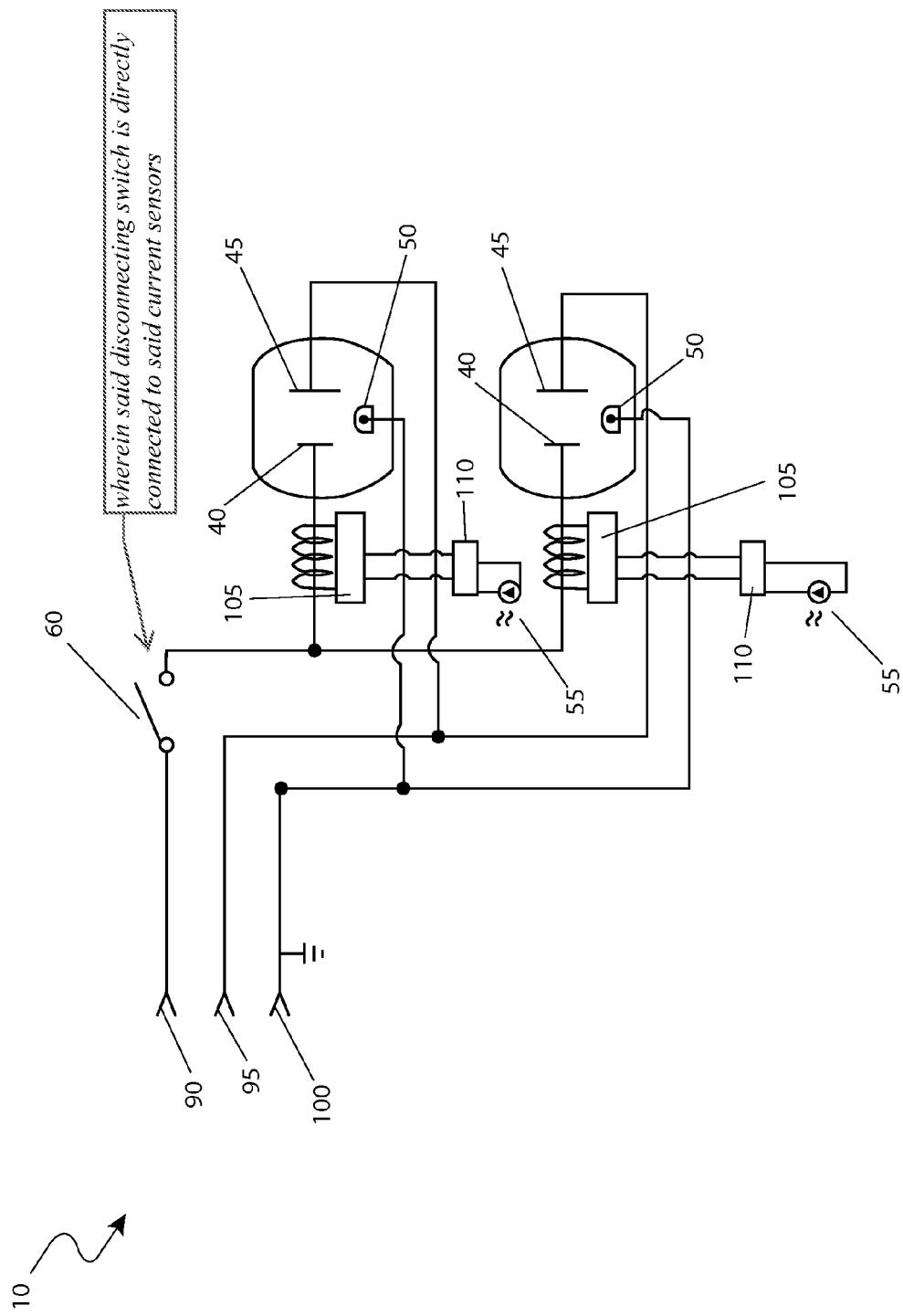

The receptacle enclosure 16 is interconnected to corresponding and existing electrical wires by respective conductors 90, 95, 100 (also see FIG. 4). Each conductor 90, 95, 100 is preferably a common screw-type connection, yet other means may be utilized without limiting the scope of the apparatus 10. Electrical wire is looped around each conductor 90, 95, 100 and tightened which secures said wires to the receptacle enclosure 16.

Figure 3:
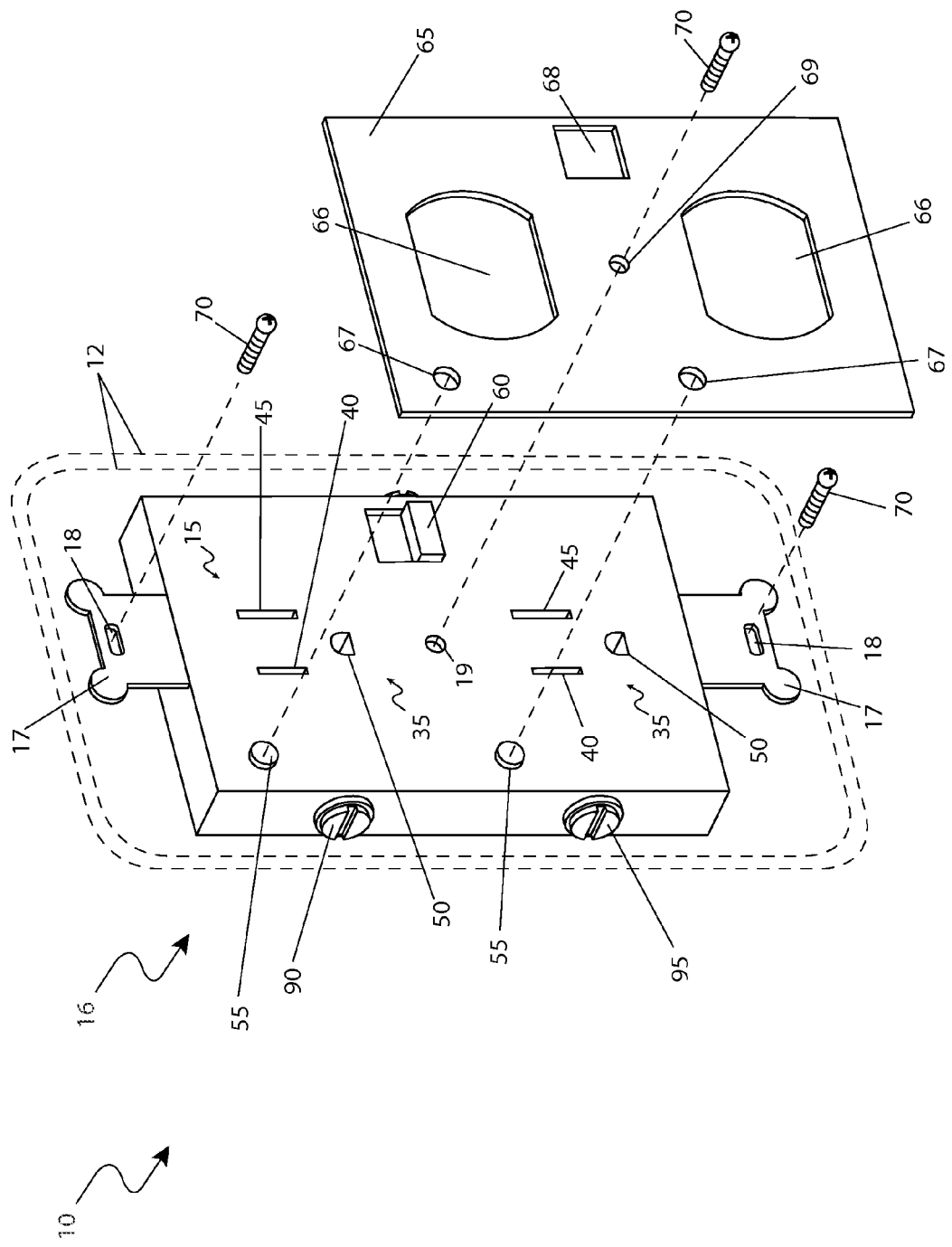
FIG. 3 is an opposing front perspective view of the receptacle enclosure 16 and a faceplate 65, according to an alternate embodiment of the present invention; and, FIG. 4 is an electrical block diagram depicting the major electrical components as used in the duplex outlet with current indicator 10, according to the preferred embodiment of the present invention.

Referring now to FIG. 3, a front perspective view of the receptacle enclosure 16 and the faceplate 65, according to the preferred embodiment of the present invention, is disclosed. With the receptacle enclosure 16 installed within the electrical box 12 a faceplate 65 may be attached. The faceplate 65 comprises a rectangular shape with dimensions slightly larger than the receptacle enclosure 16 and provides an aesthetically pleasing appearance to the apparatus 10. The faceplate 65 includes a pair of receptacle openings 66, a pair of indicating means openings 67, a switch opening 68, and a mounting opening 69. The faceplate 65 is fabricated from materials such as, but not limited to: plastic, metal, or the like and manufactured in various colors and patterns to correspond to variety of decors. The receptacle openings 66 frame each receptacle 35 and enable usage of said receptacles 35. The indicating means openings 67 frame each indicating means 55 to enable the user to observe said indicating means 55 and the switch opening 68 frames the disconnecting switch 60 to enable the user to activate or deactivate said disconnecting switch 60. The mounting opening 69 is positioned between the receptacles 35 and aligns with the faceplate aperture 19 which further enables the fastener 70 is be inserted through the mounting opening 69 and fastened to the faceplate aperture 19, thereby fastening the faceplate 65 to the receptacle enclosure 16.

Referring now to FIG. 4, an electrical block diagram depicting the major electrical components of the present invention is depicted. Incoming power arrives on an ungrounded or "hot" conductor 90, a grounded or neutral conductor 95, and a safety/equipment ground conductor 100 with the ungrounded or "hot" conductor 90 being wired through the disconnecting switch 60 as shown. Connections are made to the ungrounded or "hot" connection 40, the grounded or neutral connection 45 and the safety/equipment ground connection 50 in a respective manner. A current sensor 105 is applied to the ungrounded or "hot" conductor 90 immediately before it enters each ungrounded or "hot" connection 40 as shown. Such positioning allows for the easy determination of any AC current being utilized by each receptacle 35. The output of each current sensor 105 is routed to an analog input converting module 110 which takes the analog output of the current sensor 105 and coverts it to the necessary voltage as required by the indicating means 55. Power wiring from the ungrounded or "hot" conductor 90, the grounded or neutral conductor 95, and the safety/equipment ground conductor 100 are routed to each analog input converting module 110 to allow for necessary operation. Internal operation of the current sensor 105 and the analog input converting module 110 are well known in the art and are not intended to be a limiting factor of the present invention.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: acquiring the apparatus 10; connecting the existing electrical wire to the appropriate ungrounded or "hot" conductor 90, the grounded or neutral conductor 95 and the safety/equipment ground conductor 100; fastening the receptacle enclosure 16 to the electrical box 12 by inserting fasteners 70 into each mounting aperture 18 upon each mounting ear 17; fastening the faceplate 65 to the receptacle enclosure 16 by aligning the mounting opening 69 with the faceplate aperture 19 and inserting and fastening a fastener 70; plugging in various electrical loads 20 into the duplex outlet configuration 15 in a common and well-known manner, by connecting the power cable 25 and the electrical plug 30 to the receptacles 35; closing the disconnecting switch 60 to enable the electrical load 20 to function in a normal manner; enabling the indicating means 55 will give the user the necessary information to allow for continued current draw by the electrical load 20 or to electrically remove the electrical load 20 by either unplugging it, or turning it completely OFF by using the disconnecting switch 60; and, providing for easy visualization of electric power consumption in a manner which is quick, easy and effective, thus allowing the user to make intelligent decisions about cost savings and conservation.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

The invention claimed is:

1. An electrical outlet for indicating current flow to an existing parasitic electrical load while the existing parasitic electrical load is at on and off modes, said electrical outlet comprising:
 a housing having a duplex outlet configuration provided with a plurality of electrical receptacles adapted to removably receive an existing electrical plug of the existing parasitic electrical load, each of said electrical receptacles having an ungrounded connection, a neutral connection, and a ground connection respectively;

a plurality of indicating mechanisms in electrical communication with said electrical receptacles for visually indicating whether current is flowing to said electrical receptacles respectively;

a plurality of current sensors in electrical communication between said ungrounded connections and said indicating mechanisms respectively, said current sensors generating analog outputs upon detecting the current flow to said electrical receptacles respectively;

a plurality of analog input converting modules electrically coupled to said current sensors and said indicating mechanisms respectively, said analog input converting modules being capable of receiving and converting said analog outputs to voltage outputs respectively, wherein said voltage outputs are transmitted to said indicating mechanisms respectively; and, a disconnecting switch electrically coupled to said ungrounded electrical connections as well as an existing ungrounded conductor;

wherein said disconnecting switch, when toggled to an off mode, is capable of removing the existing parasitic electrical load from said electrical receptacles.

2. The electrical outlet of claim 1, wherein said ungrounded connection is adapted to be in electrical communication with the existing ungrounded conductor, said neutral connection is adapted to be in electrical communication with an existing neutral conductor, and said ground connection is adapted to be in electrical communication with a ground contact.

3. The electrical outlet of claim 1, wherein said analog input converters are in electrical communication between said current sensors and said indicating mechanisms respectively.

4. The electrical outlet of claim 1, wherein at least one of said indicating mechanisms comprises: a light-emitting diode illuminated upon receiving said voltage outputs.

5. The electrical outlet of claim 1, wherein said disconnecting switch is located on a face of said housing and is manually toggled between on and off positions.

6. The electrical outlet of claim 1, wherein said duplex outlet is adapted to be electrically hardwired to an existing wall outlet.

7. The electrical outlet of claim 1, wherein said duplex outlet is adapted to be removably plugged into to an existing wall outlet.

8. The electrical outlet of claim 1, wherein said current sensors are electrically coupled to said ungrounded conductor prior to reaching said ungrounded connections respectively.

9. An electrical outlet for indicating current flow to an existing parasitic electrical load while the existing parasitic electrical load is at on and off modes, said electrical outlet comprising:

a housing having a duplex outlet configuration provided with a plurality of electrical receptacles adapted to removably receive an existing electrical plug of the existing parasitic electrical load, each of said electrical receptacles having an ungrounded connection, a neutral connection, and a ground connection respectively;

a plurality of indicating mechanisms in electrical communication with said electrical receptacles for visually indicating whether current is flowing to said electrical receptacles respectively;

a plurality of current sensors in electrical communication between said ungrounded connections and said indicating mechanisms respectively, said current sensors generating analog outputs upon detecting the current flow to said electrical receptacles respectively;

a plurality of analog input converting modules electrically coupled to said current sensors and said indicating mechanisms respectively, said analog input converting modules being capable of receiving and converting said analog outputs to voltage outputs respectively, wherein said voltage outputs are transmitted to said indicating mechanisms respectively;

a disconnecting switch electrically coupled to said ungrounded electrical connections as well as an existing ungrounded conductor; and, a face plate removably positioned over said housing such that said indicating mechanisms and said disconnecting switch are visible from an exterior of said face plate;

wherein said disconnecting switch, when toggled to an off mode, is capable of removing the existing parasitic electrical load from said electrical receptacles;

wherein said disconnecting switch is directly connected to each of said current sensors.

10. The electrical outlet of claim 9, wherein said ungrounded connection is adapted to be in electrical communication with the existing ungrounded conductor, said neutral connection is adapted to be in electrical communication with an existing neutral conductor, and said ground connection is adapted to be in electrical communication with a ground contact.

11. The electrical outlet of claim 9, wherein said analog input converters are in electrical communication between said current sensors and said indicating mechanisms respectively.

12. The electrical outlet of claim 9, wherein at least one of said indicating mechanisms comprises: a light-emitting diode illuminated upon receiving said voltage outputs.

13. The electrical outlet of claim 9, wherein said disconnecting switch is located on a face of said housing and is manually toggled between on and off positions.

14. The electrical outlet of claim 9, wherein said duplex outlet is adapted to be electrically hardwired to an existing wall outlet.

15. The electrical outlet of claim 9, wherein said duplex outlet is adapted to be removably plugged into to an existing wall outlet.

16. The electrical outlet of claim 9, wherein said current sensors are electrically coupled to said ungrounded conductor prior to reaching said ungrounded connections respectively.

17. A method of utilizing an electrical outlet for indicating current flow to an existing parasitic electrical load while the existing parasitic electrical load is at on and off modes, said method comprising the steps of:

providing a housing having a duplex outlet configuration provided with a plurality of electrical receptacles, each of said electrical receptacles having an ungrounded connection, a neutral connection, and a ground connection respectively;

providing and electrically communicating a plurality of indicating mechanisms with said electrical receptacles;

providing and electrically communicating a plurality of current sensors between said ungrounded connections and said indicating mechanisms respectively;

providing and electrically coupling a plurality of analog input converting modules to said current sensors and said indicating mechanisms respectively; and, providing and electrically coupling a disconnecting switch to said ungrounded electrical connections as well as an existing ungrounded conductor;

wherein said disconnecting switch is directly connected to each of said current sensors.

18. The method of claim 17, further comprising the steps of:

removably plugging the existing parasitic electrical load into said electrical receptacles;

said current sensors generating analog outputs upon detecting the current flow to said electrical receptacles respectively;

said analog input converting modules receiving and converting said analog outputs to voltage outputs respectively;

transmitting said voltage outputs to said indicating mechanisms respectively;

said indicating mechanism visually indicating whether current is flowing to said electrical receptacles respectively; and, if current is flowing to said electrical receptacles, toggling said disconnecting switch to an off mode thereby removing the existing parasitic electrical load from said electrical receptacles.

* * * * *